US005692357A

United States Patent [19]

McCain

[11] Patent Number: 5,692,357

[45] Date of Patent: Dec. 2, 1997

[54] ADJUSTABLE TEMPLATE AND JIG

[76] Inventor: Maurice McCain, P.O. Box 10184, Westbury, N.Y. 11590

[21] Appl. No.: 446,004

[22] Filed: May 19, 1995

Related U.S. Application Data

[63] Continuation-in-part of Ser. No. 73,942, Jun. 10, 1993, abandoned.

[51] Int. Cl.[6] .......... G01B 1/00

[52] U.S. Cl. .......... 52/749.1; 33/194; 33/528; 33/DIG. 10

[58] Field of Search .......... 33/528, 194, DIG. 10; 52/749.1

[56] References Cited

U.S. PATENT DOCUMENTS

| | | | |
|---|---|---|---|
| 820,448 | 5/1906 | Turpin | 33/456 |
| 2,438,667 | 3/1948 | Hogue | 33/194 |
| 3,522,658 | 8/1970 | Howell | 3/528 |
| 4,058,902 | 11/1977 | Hall | 33/194 X |
| 4,059,907 | 11/1977 | Dauber | 33/528 |
| 4,423,555 | 1/1984 | Wooten | 33/528 X |
| 4,649,652 | 3/1987 | Dickinson et al. | 33/562 |
| 5,222,303 | 6/1993 | Jardine | 33/528 |

*Primary Examiner*—Christopher T. Kent

*Attorney, Agent, or Firm*—Cushman Darby & Cushman, IP Group of Pillsbury Madison & Sutro LLP

[57] ABSTRACT

An adjustable template and jig that covers a wall area of 32 square feet, or less, the size of a standard sheet of rigid wall covering, that can be adjusted to an infinite variety of configurations to simulate the exact shape said sheets of rigid wall coverings must be cut before installation. The cutting information included in the completed configuration include, but is not limited to, openings for ducts, electrical outlets, forming around doorways and windows, angles required because of stairs, or sloping ceilings, out of plumb and out of square openings and corners, exact width and length panels must be cut, and allowance for all other objects that may protrude beyond the plane of surfaces being covered. The completed configuration can the be fixed by tightening knobs provided for that purpose, removed from the wall location, and laid on the surface of the panel to be installed, for use as a template for marking, or a jig for cutting.

7 Claims, 4 Drawing Sheets

FIG. 13
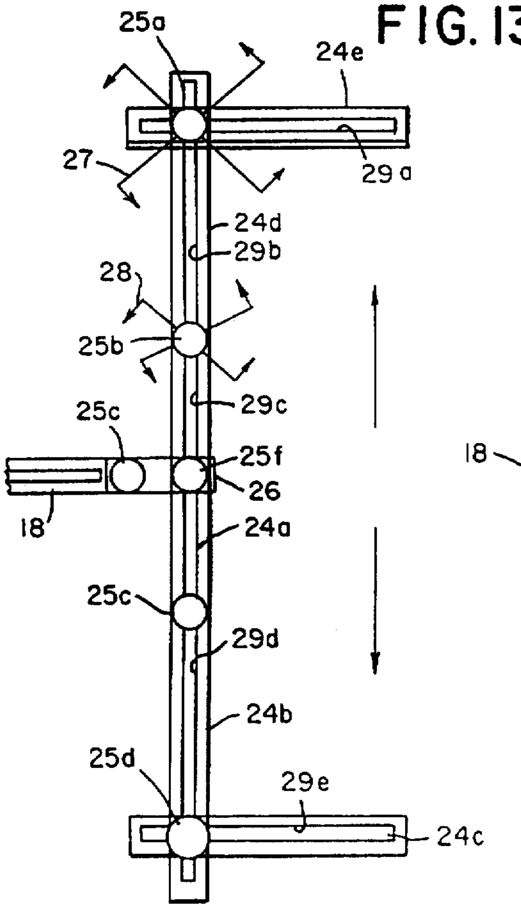
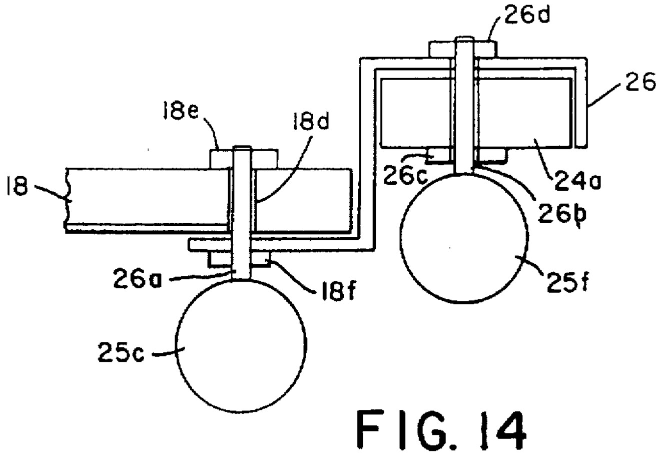
FIG. 14
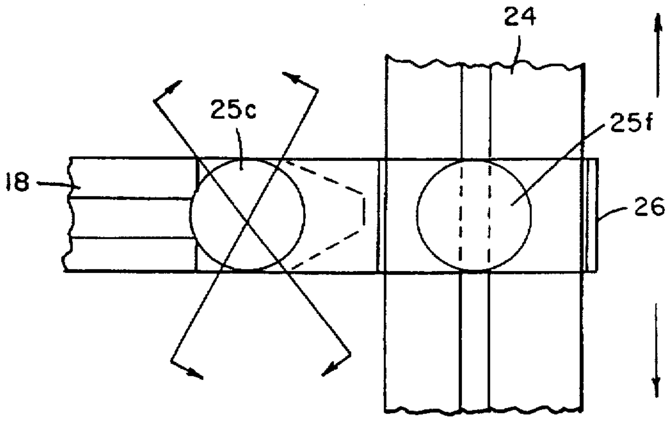
FIG. 15

ADJUSTABLE TEMPLATE AND JIG

CROSS-REFERENCE TO RELATED APPLICATIONS

This is a continuation-in-part of U.S. application Ser. No. 08/073,942 filed Jun. 10, 1993, now abandoned.

BACKGROUND OF THE INVENTION

1. Field of the Invention

Heretofore an installer of rigid wall coverings such as plywood paneling, gypsum wall board, masonite, etc. was required to have knowledge and experience in the field of carpentry to determine the cutting requirements of such materials. One must be able to determine the proper length and width of panels being installed as well as cutting requirements to accommodate doorways, window openings, stair angles, outlets for ducts, electrical fixtures, etc. Even the skilled carpenter finds this to be a tedious and time consuming task, and regardless of experience, some error is inevitable. The present invention provides an adjustable template and jig that can be configured to establish the exact length and width of panels, as well as the required shapes necessary to fit such panels around doorways, windows, stairways, sloping ceiling conditions, electrical outlets, duct openings, etc. Once configured against a 32 sq. ft., or less, area of wall to be covered, the template and jig can be easily removed, placed upon the face of the panel to be installed, thus transferring cutting specifications from the wall surface to the panel, thereby eliminating the need for aforementioned complex measuring and layout techniques. A more detailed description is contained herein.

2. Background of the Art

In the past, attempts have been made to provide installers with apparatus to assist in the locating of electrical wall outlets. Howell, U.S. Pat. No. 3,522,658 discloses an electric outlet box locator which would help one to locate electric outlets after the wall board is in place. This apparatus is extremely limited, in that it not only require the installer to stand the panel in place to mark it for cutting, but also, it only addresses the problem of cutting for electrical outlets. Elkins, U.S. Pat. No. 3,672,064 and Minozzi, U.S. Pat. No. 4,285,135 like Howell, addresses the locating of outlets during panel installations.

SUMMARY OF THE INVENTION

Generally, this invention comprehends apparatus to eliminate prior skill requirements by providing installers of rigid wall coverings with complete cutting specifications without requiring knowledge of arithmetic, measuring techniques, nor the use of instruments that require such knowledge. The cutting specifications provided may include but are not limited to electrical outlets as provided for in the prior arts. This apparatus predetermines any and all cutting requirements, including proper length and width of panels, forming for doorways, windows, stair angles, sloping ceilings, out of plumb comers, etc. its moving parts allow for infinite adjustments, for the purpose of forming the apparatus into a plurality of template and jig shapes. Also, the methodology employed allows the installer to do all cutting before lifting the panel to its wall location.

A primary object of this invention is the provision of apparatus for accurately determining all cutting requirements of any rigid coverings to be installed on wall surfaces.

Another object of this invention is to permit its use by installers of rigid wall coverings who have no prior experience in such installations by eliminating the need for knowledge of measuring techniques.

A still further object of this invention is the provision of an apparatus that is itself a complete and adjustable template and jig as apposed to a method of conveying templates as provided by prior arts.

The above and other objects, features, and advantages of this invention will be apparent in the following detailed description of embodiments, which is to be read while referring to the accompanying drawings.

BRIEF DESCRIPTION OF DRAWINGS

FIG. 13 is a top view of pivoting, adjustable arms attached to ends of a horizontal slide bar to enable said template and jig to be configured to accommodate doorways, windows, and a plurality of other wall, and ceiling conditions, as shown in, but not limited to, FIG. 2, 3, 4, 5, 7.

FIG. 14 is a top view through pivoting, adjustable arms, shown in FIG. 13.

FIG. 15 is an exploded view of the pivotal bracket which attaches the horizontal slide bar to the adjustable arms.

DESCRIPTION OF EMBODIMENTS

Figure 1:
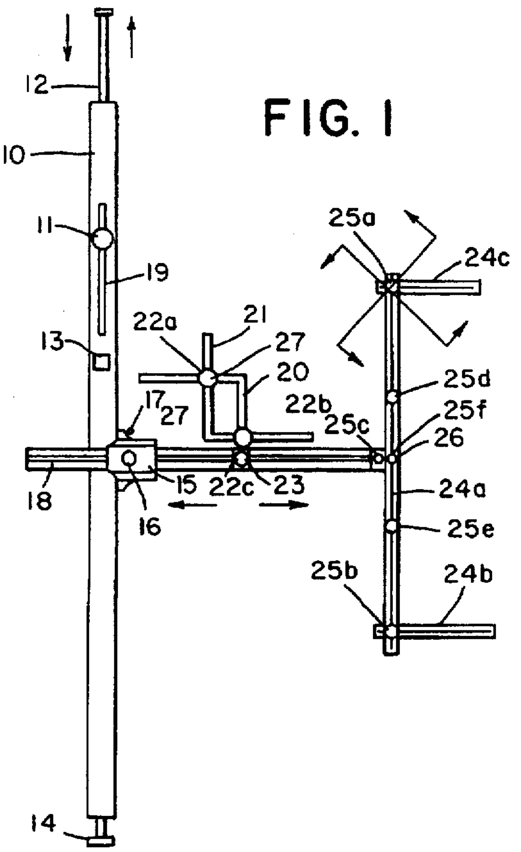
FIG. 1 is an elevational view of an apparatus standing at a wall location showing a variety of possible motions required to conform to numerous configurations, including, but not limited to those shown at FIG. 2 through FIG. 7.

FIG. 1 of the drawings discloses an apparatus with a vertical bar generally designated 10, equipped with an adjustable shoe 12 at its top, controlled by a knob 11, and a tension spring 14 at its bottom. When the adjustable shoe 12 is engaged against a ceiling, and set by tightening knob 11, while compressing tension spring 14 so that the bottom of bar 10 is approximately ¼ inch off floor, the distance from the bottom of bar 10 to the top of adjustable shoe 12 will always be equal to the panel length required. The vertical bar 10 is also equipped with a level eye 13 to assure the bar is held in a plumb position during this operation.

FIG. 1 of the drawings also discloses an apparatus with a bracket generally designated 15, with means to attach to, and slide vertically along the vertical bar 10 and be fixed at a desired height by tightening knob 17. Said slide bracket 15 also provides within its construction a conduit through which a second bar 18 can slide horizontally and be fixed at a desired location by tightening knob 16.

FIG. 1 of the drawings also discloses an apparatus with a slide bracket generally designated 23 which attaches to a set of adjustable arms 21 and 22, while sliding horizontally along secondary bar 18, and can be set at a desired location by tightening knobs **22*a*, 22*b* and 22*c***.

FIG. 1 of the drawings also discloses an apparatus with an end bracket generally designated 26 with means to attach to and pivot on the end of the second bar 18, while providing within its construction means by which adjustable arms **24*a*, 24*b* and 24*c* can slide and all moving parts be fixed at a desired position by tightening knobs 25*a* through 25*f*** to allow any of the configurations shown in FIG. 2 through 7.

FIG. 1 of the drawings discloses apparatus that can conform to an infinite variety of configurations by the use of the embodiments described above, removed from the wall by exerting slight downward pressure on tension spring 14, and laid upon the face of panels to be installed, for use as a template for marking, or a jig to guide an appropriate cutting tool, to cut panels to exact specifications.

Figure 2:
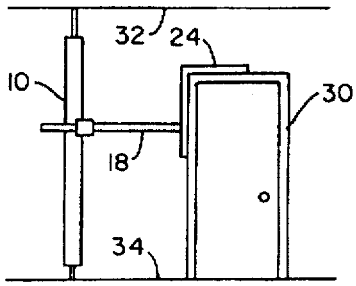
FIG. 2 shows the inventive apparatus in relation to typical doorway configuration.

FIG. 2 illustrates use of the adjustable template for fixedly conforming to the shape of a doorway 30. As shown, the vertical bar 10 of the template is held in position by spring-loaded tension against a ceiling 32 and a floor 34. The lateral member 18 is locked at a longitudinal position along vertical member 10. While the vertical bar 10 is engaged against the floor and ceiling and the lateral member is fixed at a location along the vertical bar, an adjustable member 24 is positioned to form a right angle about the peripheral edge of doorway 30 and then locked in position at the distal end of lateral member 18.

Figure 3:
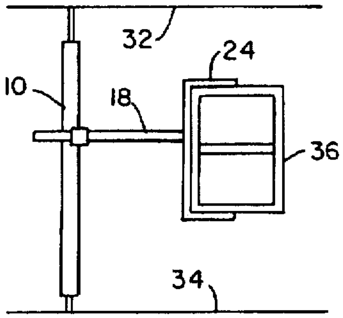
FIG. 3 shows the inventive apparatus in relation to typical window configuration.
Figure 4:
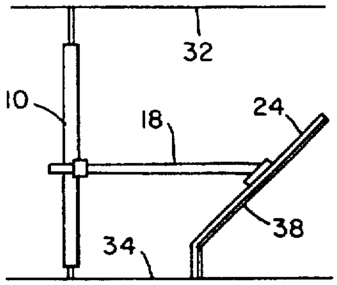
FIG. 4 shows the inventive apparatus in relation to typical stair configuration, and when reversed will conform to sloping ceiling.
Figure 5:
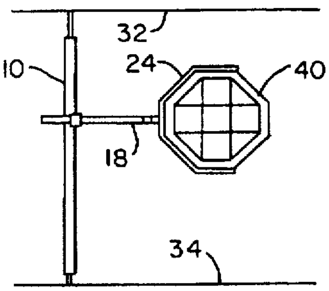
FIG. 5 shows an inventive apparatus in relation to an octagon window.

Likewise, in FIG. 3, the adjustable member 24 is manipulated to take the shape of the periphery of the frame of window 36 while the vertical and lateral members are fixed in position, and in FIG. 4, the adjustable member 24 is manipulated to assume the shape of wall molding of an inclined stairwell while the vertical and lateral members are fixed in position. Similarly, FIG. 5 shows conforming the adjustable member 24 around an hexagonally shaped window 40.

In each case, as illustrated in FIGS. 2 through 5, after each lockable bracket of the template is secured to maintain the relational shapes and configurations of the adjustable templates, the entire assembly is transferred to the surface of a rigid wall covering (not shown), such as a wooden wall panel. While laying against the surface of a rigid wall covering, the template is used as a jig for marking cut lines or for guiding a cutting tool to remove certain portions of the rigid wall covering.

Figure 6:
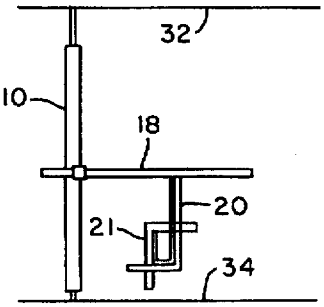
FIG. 6 shows an inventive apparatus in relation to wall outlets, duct openings, etc.

FIG. 6, on the other hand, illustrates jig-formation for a wall-mounted utility cutout. In this case, a complementary pair of right-angle cross-connected members 20 and 21 is adapted to form a rectangular opening that corresponds to the desired position of a cutout. The size of the rectangular opening is adjustable according to the relative positions of the cross-connected members 20 and 21, the lateral position of the opening is adjusted by fixing the position of member 20 along lateral member 18, and the vertical position of the opening is adjusted by fixing the position of the member 18 at a longitudinal position along member 10. When all members are fixedly secured relative to each other, the entire assembly is then transferred from its temporary wall-mounted location and placed directly over a rigid wall covering. The rectangular opening is then used as a template for marking the position of the rectangular cutout or as a jig for guiding a cutting tool to remove a rectangular cutout from a rigid wall covering.

Figure 7:
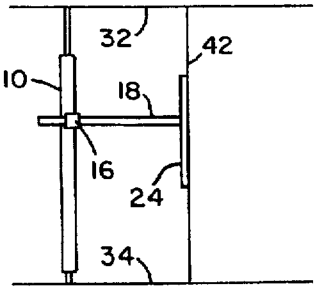
FIG. 7 shows an inventive apparatus configured to determine ceiling height and panel width.

FIG. 7 illustrates the adjustable template as used in measuring the width of a desired cutout to be made from a rigid wall covering. As in the previous embodiments, the vertical bar 10 of the template is positioned between a ceiling 32 and a floor 34. The adjustable arms at the distal end of bar 18 are oriented substantially vertically and are displaced along bar 18 by a distance corresponding to the desired width of the cut, represented in FIG. 7 by numeral 42.

Figure 8:
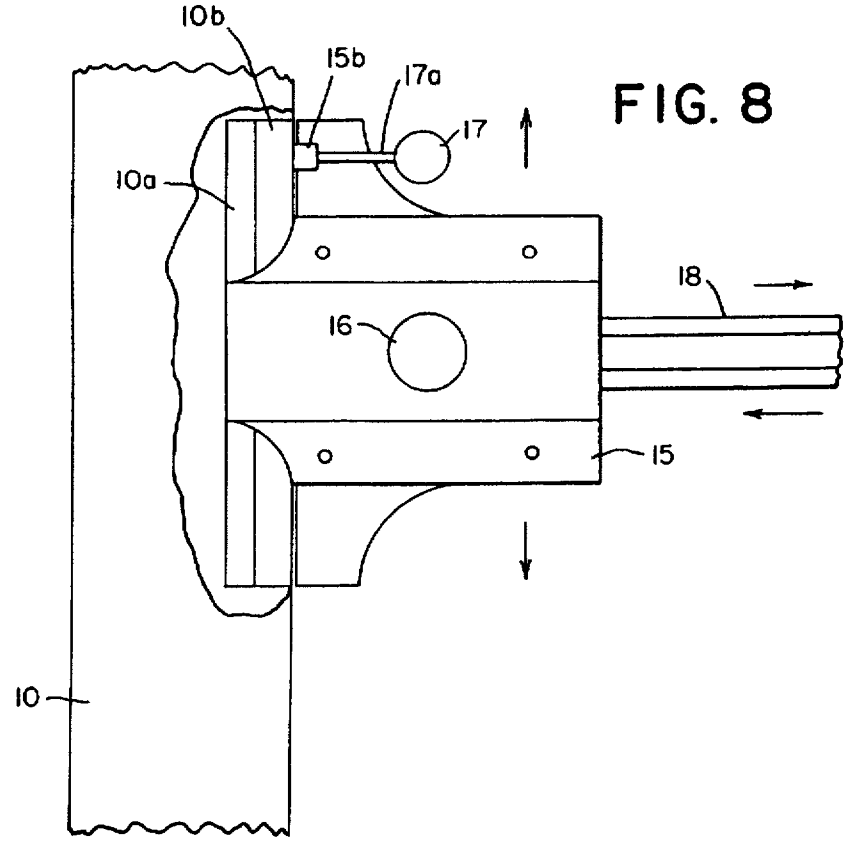
FIG. 8 is a top view of the housing bracket which slides up and down the vertical bar of the invention apparatus of FIG. 1 while allowing a second bar to slide horizontally through its body to fix the required locations of adjustable arms shown in FIG. 1, 11, 12, 13, 14, and 15.
Figure 9:
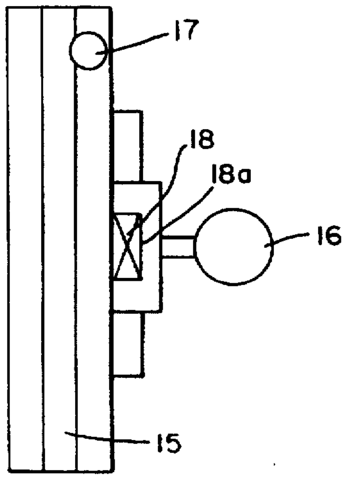
FIG. 9 is a side view of the housing bracket, shown in FIG. 8.
Figure 10:
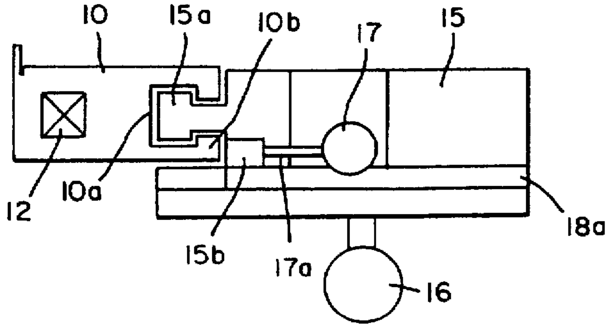
FIG. 10 is another side view of the housing bracket, shown in FIG. 8.

FIGS. 8, 9 and 10 illustrate the construction of primary or housing bracket 15 and its coupling with lateral member 18 with vertical member 10. Bracket 15 includes a conduit **18*a* (FIGS. 9 and 10) for slidably receiving lateral member 18. When laterally positioned at a desired location, a knob 16, having conventional tightening means such as a threaded shaft 16*a*, is turned to tighten shaft 16*a* against the member 18** in order to hold it in position.

As is clear from FIG. 10, bracket 15 includes a tongue which fits within a groove **10*a* provided in vertical bar 10 so as to permit the bracket to be displaced relative to the length of bar 10. In conventional fashion, the bracket can be locked at a desired position relative to bar 10 by means of a locking knob 17 and associated shaft 17*a* (also shown in FIG. 10). As is well understood, locking of the bracket is achieved in conventional fashion by the shaft passing through block 15*b* to engage a lip 10*b* of bar 10**.

Figure 11:
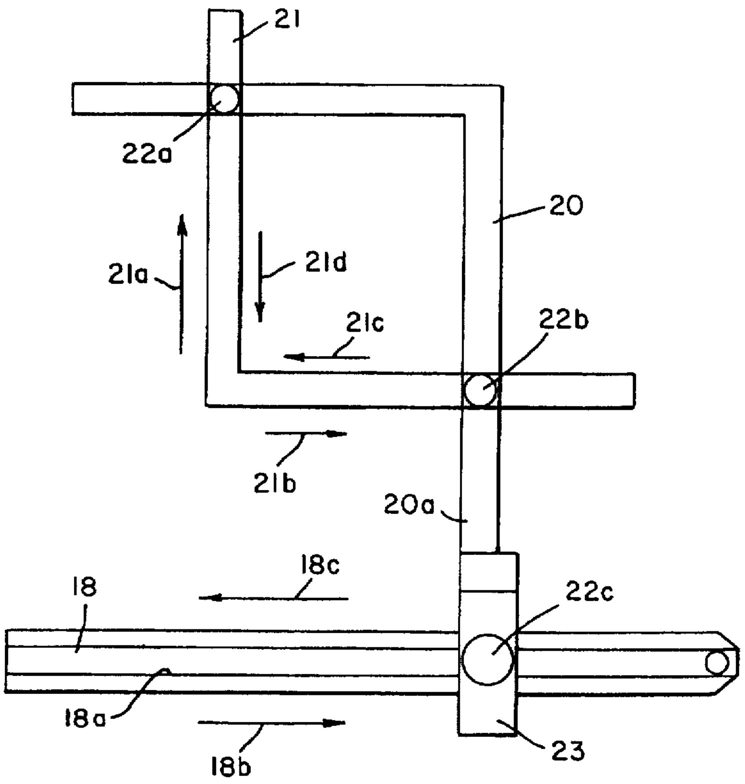
FIG. 11 is a top view of sliding adjustable arms that slide along a horizontal slide bar to enable said template and jig to be configured to accommodate a plurality of square and rectangular cutouts required by electrical outlets, duct openings, etc.
Figure 12:
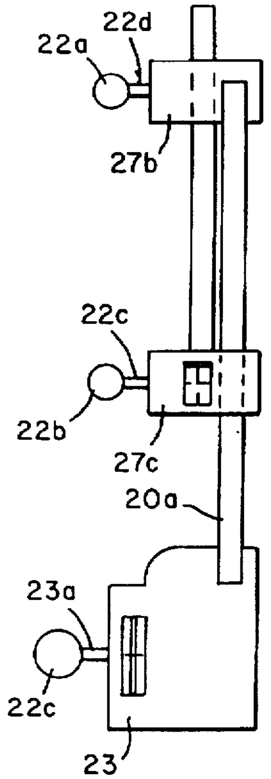
FIG. 12 is a side view of sliding adjustable arms shown in FIG. 11.

FIGS. 11 and 12 show a first set of adjustable arms which attaches to the lateral member 18. As indicated by the directional arrows **18*b* and 18*c* in FIG. 11, the lateral member 18 includes a slot 18*a* which enables a supporting block 23 to be fixed at various lateral positions. Supporting block 23 includes a knob 22C and shaft 23*a* adapted to forcibly engage the lateral member 18 to secure the block 23. Block 23 supports one leg 20*a* of a pair of complementary cross-connecting right angle members 20 and 21. The members 20 and 21 are adjustably arranged to form a rectangle opening for use as a template marking the desired cutout location for a wall-mounted utility outlet. The cross-connect members 20 and 21 adjustably connect via coupling blocks 27*a* and 27*b*. Each have conduits journalled therethrough for receiving respective legs of members 20 and 21 to guide them in opposed directions as indicated by directional arrows 21a through 21*d* in order to form rectangular openings of various sizes. Coupling blocks 27*a* and 27*b* include respective knobs 22*a* and 22*b* having shafts 22*c* and 22*d* which, when tightened in a conventional manner, fixedly hold the cross-connect members 20 and 21** in a fixed rectangular relation.

FIGS. 13, 14 and 15 depict top, front and side views of a tertiary bracket 26 and segmented member that attaches to a distal end of lateral member 18.

As can be appreciated from FIG. 14, the attachment of the adjustable arms to the distal end of member 18 is accomplished by a pin **26*a* passing through an aperture 18*d* in member 18, the pin being joined to a knob 25*c* at one of its ends. This arrangement permits the adjustable arms to pivot relative to member 18 until locking occurs. A cap 18***e* and bushing 18*f* cooperatively establish friction locking of any fixed angular position of members 18 and 26 relative to each other upon tightening knob 25*c*. Likewise, FIG. 14 illustrates a mechanism for further permitting displacement of the adjustable arms relative to member 18. This is accomplished by pin 26*b* and the associated knob 25*f* and cap 26*d*.

As can be appreciated from the previously described embodiments of FIGS. 1–7, the adjustable arms joined to the distal end of bar 18 comprise several segments. In FIG. 13, five such segments are identified (24*a*–24*e*), adjacent segments being joined in adjustably lockable pivotal relationship in the same manner by which the assembly of adjustable arms is joined to bar 18, as described above with respect to FIG. 14. However, for convenience of illustration, the details of the interconnections between adjacent arm segments have been omitted. Instead, the connections are represented by knobs 25*a*–25*d*. As is apparent from FIG. 18, the arm segments are slotted at 29*a*–29*e* to permit locking of adjacent segments to occur at different points along the lengths of the arm segments. This arrangement enables the segmented member to assume a variety of geometric shapes to match varied wall configurations when mounting rigid wall covering, e.g., a straight edge such as encountered along a stairwell rising, a rectangular window frame or part of a hexagonal window frame.

The foregoing preferred embodiment sets forth only an example of the invention and is not intended to be limiting. Variations as known or may come to those of ordinary skill are embraced by the appended claims which define the scope of the invention.

What is claimed is:

1. An adjustable template and jig for reducing measuring requirements while installing rigid wall coverings on a wall from a floor to a ceiling, said adjustable template and jig comprising:

a vertical bar including a leveling device for plumbing said vertical bar with said wall, said vertical bar further including means to adjustably extend the length thereof to engage said floor and ceiling in a manner to establish the length of panels to be cut, a secondary bar, a housing bracket with a fastener to attach to and slide vertically along said vertical bar to become fixed at a desired height between said floor and ceiling said housing bracket including a conduit for slidably receiving said secondary bar and a locking mechanism for locking said secondary bar at various lateral positions, a first set of adjustable arms adapted to form a cutout template with a secondary bracket slidably attached to said secondary bar and including means to lock said first set of adjustable arms at a desired location along said secondary bar, a second set of adjustable arms, a tertiary bracket pivotally attached to one end of said secondary bar and including a mechanism for receiving and fixedly positioning said second set of adjustable arms, said second set of adjustable arms including slotted arms and pivoting connections that enable formation of templates that conform to shapes of panel cutouts for doorways or windows.

2. A configurable template for forming a jig for guiding a cutting tool for cutting a variety of shapes in a rigid wall covering for a doorway, a window or a wall-mounted utility outlet, said configurable template comprising:

a longitudinal member including an adjustable shoe having a tension-loaded mechanism that enables said longitudinal member to fixedly engage at least one of a floor and a ceiling in proximity to said wall, a primary bracket which slidably engages said longitudinal member, said bracket including a fastener for fastening said bracket at various longitudinal positions along said longitudinal member and a receiving guide for slidably receiving a lateral member, said lateral member including a first set of adjustable arms for forming a cutout template and a secondary bracket for fixedly positioning said adjustable arms at various lateral positions along said lateral member, and a tertiary bracket located at one end of said lateral member and including a locking mechanism for pivotally positioning a segmented member at various pivotal positions, said segmented member including a plurality of segments and pivotal locking joints between said segments for enabling the member to fixedly conform to the shape of a rigid wall covering cutout for a doorway or window.

3. A configurable template as recited in claim 2 wherein the segments of said segmented member include slots that slidably engage within said pivotal locking joints thereby to enable angular and longitudinal adjustment of each segment to form a cutout template.

4. A configurable template as recited in claim 2 wherein the adjustable arms fixedly attachable to said lateral member comprise a pair of complementary right-angle members and cross-connect support blocks for slidably receiving and locking respective legs of said right-angle members thereby to form an adjustable rectangular shaped template for a wall-mounted utility cutout.

5. A configurable template as recited in claim 2 wherein said primary bracket includes a lip for slidably engaging a slot and said longitudinal member comprises a bar that includes a slot for slidably receiving the lip of said primary bracket, said primary bracket further including means for fixedly engaging said lip within the slot of said longitudinal member.

6. A configurable template as recited in claim 2 wherein the length of said longitudinal member includes an adjustable longitudinal member for adjusting the length of said member to equal the length of wall covering to be cut thereby to facilitate placement of the template on said rigid wall covering for use as a guiding jig for cutting.

7. A configurable template as recited in claim 2 further including a level device for enabling plumb alignment of said longitudinal member with said wall.

* * * * *